United States Patent [19]

Botnick

[11] 3,828,815

[45] Aug. 13, 1974

[54] FIXTURE SHUTOFF VALVE WITH DRAIN

[76] Inventor: Irlin H. Botnick, 3155 Kerdale, Pepper Pike, Ohio 44124

[22] Filed: July 26, 1973

[21] Appl. No.: 382,946

[52] U.S. Cl. .......................................... 137/625.26
[51] Int. Cl. ............................................ F16k 11/02
[58] Field of Search..... 137/625.26, 625.68, 625.25, 137/625.2, 625.38; 251/325, 339

[56] References Cited
UNITED STATES PATENTS
3,168,353  2/1965  Horowitz ................... 137/625.26 X
3,608,584  9/1971  Vaughn.......................... 137/625.26

Primary Examiner—William R. Cline
Assistant Examiner—Robert J. Miller
Attorney, Agent, or Firm—P. D. Golrick

[57] ABSTRACT

A compact, low cost shutoff valve for a fixture water supply line, which blocks flow by the front of a stem-carried main piston advanced into and slidingly sealing a bore forming part of the inlet-to-outlet flow path; and with closing motion continued after shutoff, a trailing part of the stem as a sealing piston leaving a sealed relation with a cylindrical body cap part exposes drainage openings in a hollow stem.

A novel main seal eliminates possibility of seal damage by overtightening after shutoff.

12 Claims, 5 Drawing Figures

FIXTURE SHUTOFF VALVE WITH DRAIN

A stop-and-waste type valve is useful not only for major water piping sections in buildings, especially residences, but also at sanitary fixtures such as lavatories or toilet bowl tanks, and even some appliances.

Prior stop-and-waste valves have been rather bulky; have had either a small capped drainage outlet requiring cap manipulation both for drainage and closure, or rather complex and multi-part structure internally of the valve or associated with the stem; and usually the effective water shutoff component, the valve seal, has been such that it is liable to be damaged by overtightening on shutoff. Further, inadvertance in leaving the drainage passage open when the valve is again turned on would result in a jetting of water on the operator or environment.

Such untoward features are disadvantages particularly unacceptable in a fixture supply shutoff valve. For such fixtures or appliances in many instances it is almost mandatory that the supply valves be small and compact, thus also unobstrusive, since generally they are located at the fixture itself. Further it is desirable that the valve in such service be not readily damaged by forceful turning after closed position is attained, as is so often the case with currently available supply valves, and that no pressured water flow from drainage passages can result due to operator inadvertance.

It is the general object of the present invention to provide a valve of the character described, which advantageously overcomes one or more problems of prior devices in a compact form while achieving the desired functions.

Another object is to provide a valve structure of sturdy form readily fabricated at low cost for the purpose intended.

A further object is to provide a valve of the character described incorporating a shutoff seal or valving arrangement which is not subject to damage by tight closing.

A still further object is to provide a valve which is made operative for drainage of the fixture and its controlled supply line by the same handle used for ordinary off-on operation; and which automatically closes an open drainage path as the valve is reopened.

Other objects and advantages will appear from the following description and the drawings wherein.

Figure 1:
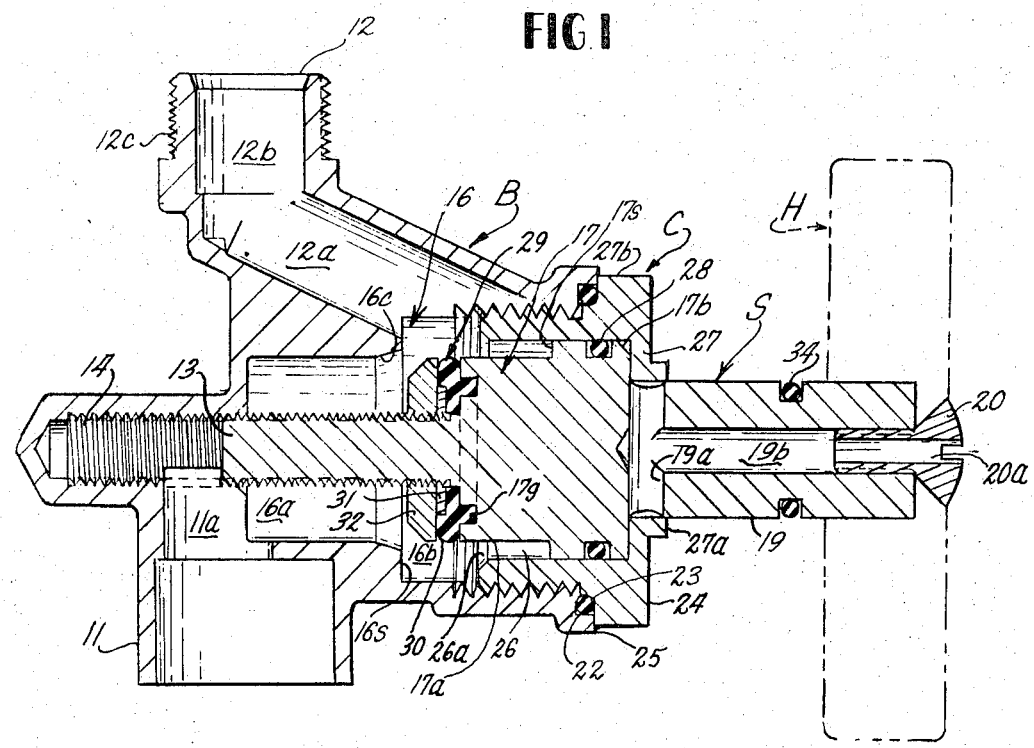
FIG. 1 is a longitudinal sectional view of a valve embodying the invention, the section being taken along an axial plane through the common centerline of aligned inlet and outlet connections, the valve being shown fully open.

The drawings show one embodiment of the invention in a valve for a water line to a fixture or appliance for which it is desirable, in addition to an off-on operation, to provide for drainage of water from the fixture and the intervening line. Though the valve is particularly suitable for that environment, it also has utility for general stop-and-waste applications.

The principal components are the hollow body B, with aligned inlet and outlet connections 11, 12; a stem S, having threaded reduced inner end 13 engaged in a body female thread 14, for operative shifting, in the valve chamber 16, of a stem enlargement 17 as a valving member; a hollow, plug-like male-threaded bonnet or cap C screwed into the open end of the body, i.e., of the chamber 16, and coaxially apertured to rotatably slideably support the reduced stem outer part 19, on the extreme end of which an operating handle H is secured by a hollow screw 20; and certain important seal elements to be described.

Conventionally the cap head has paired opposed wrench flats 27b; the stem and handle, mating splines.

Here in the body B the inlet connection 11 is a cylindrical socket-like formation, as for a pipe sweated connection, opening through inlet port or passage 11a to the bottom of a reduced valving chamber portion or bore 16a coaxial with the centerline of the female thread 14; and the coaxial larger chamber part 16b, in effect a counterbore, discharges laterally through an oblique outlet passage 12a to the outlet connection 12, internally bored and shouldered at 12b and externally threaded at 12c, as for receiving a flexible fixture supply tube and compression seal nut therefor.

The hollow cap C is effectively sealed to the body by the simple expedient of an elastomeric O-ring 22 seated around the cap in a fillet 23 between the end of the cap male thread and the radial shoulder of the cap head 24 bearing against the end surface 25 of the body outboard of an inner peripheral rabbet affording radial and cylindrical surfaces against which the O-ring is compressed to seal more effectively under water pressure. For sealing functions to be described, cap bore or cylindrical interior surface 26 has a diameter somewhat larger than the bore forming chamber 16a and a seal lead-in bevel 26a; and an end wall 27 thickened in an outward flange 27a about and elongating the central aperture.

In the stem valving member portion 17, an outer cylindrical part 17b in diameter slightly smaller than 26, carries an O-ring 28 in a square section circumferential groove to seal in piston-like manner against the cylindrical surface 26 with which it has an interference fit, when the valve is open; while the longer inner cylindrical part 17a, slightly smaller than the diameter of bore 16a, again for achieving a piston-like seal with the bore 16a, for water shutoff, on its end face is provided with a seal arrangement at 29. The latter is comprised of an elastomeric seal ring 30, washer 31 and retainer 32; and the bore 16a has a lead-in bevel 16c for the seal element. The inner end of the cap being well spaced from the bottom 16s of the counterbore, there is ample flow space about the seal device to the discharge passage 12a, and also flow area about 17b for drainage as later related.

A transverse bore 19a adjacent 17b intersecting central bore 19b, and the hollow screw through bore 20a afford a drainage passage from the valve interior through the stem to the outside. The stem part 19 also has a circumferential square section groove receiving O-ring 34 so spaced from stem piston portion 17b that when the latter is just cleared of the cap inner end, for desired drainage with the valve shut off, the O-ring 34 seals in the cap end wall cylindrical aperture. Thus the stem is sealed to the cap for the drainage position ensuring that all water draining down through 12a, 16b and 26 is constrained predictably to escape at one point, namely the screw 20.

When the handle is turned clockwise to shut off water to the fixture, as soon as seal 29 passes into bore 16a beyond lead-in bevel 16c required for the interference-fitting seal ring 30, the water path from inlet to outlet is blocked. The relative dimensioning and axial placement of seal elements 28 and 29 is such that, at that moment and stem position, seal 28 is still in bore 26. Hence the water supply to the outlet is shut off, but no drainage is possible. Thereafter continued handle rotation carries seal 28 beyond bevel 26a and drainage thereupon can occur.

Since shoulder 17s engaging the body counterbore bottom shoulder 16s stops stem advance while seal device 29 still has clearance from the bottom of the bore 16a, even though the stem is turned in as far as possible, no damage to seal device 29 can occur. Moreover, even though no stop means were used to ensure that clearance, the seal being made with a surrounding wall rather than endwise, the seal ring and function would not be damaged.

Of course, when the valve is even initially opening, stem seal 28 is already sealed within the cap so that no leakage can occur. Though intended primarily for off-full on use, with drainage as desired, in a stop-and-waste type service, the valve may also be used at partially open position for throttling, if the seal device 29 has the form or characteristics hereinafter described, which can sustain the force of water flow without disarrangement.

The basic structure of the valve, thus providing optionally a drainage capability as well as the off-on control, is adapted to a compact embodiment. A body "blank" having the major interior passages in approximate form may be produced by modern techniques of casting, extrusion or forging. The blank is chucked once for the machining operations of female thread 14, bore parts 16a, 16b, 16c, the female threading at the end for the cap, rabbeting for ring 22 and end face finishing, since these are all coaxial; while the machining for 11 and 12 requires only a single chucking for each. The stem can be readily produced by screw machine operations from bar stock; and so also cap C, though the latter may start as a hollow cast, extruded or forged element.

Figure 2:
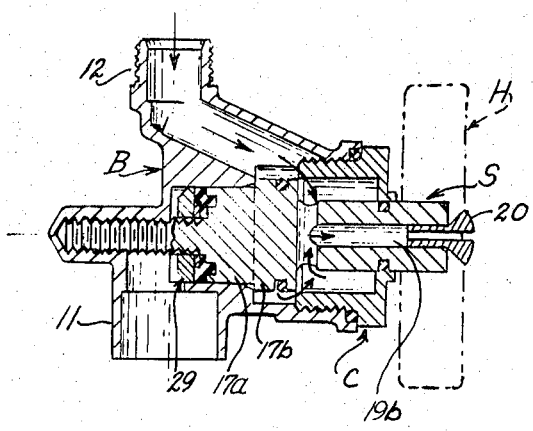
FIG. 2 is similar to FIG. 1, but with the valve closed for fixture shutoff and set for drainage.

The resilient elastomeric seal ring 30, as viewed in section in FIGS. 1 and 2, somewhat T-shaped with the shank of the T parallel to the stem axis, though integral and homogeneous, may be considered as having (a) a flat ring portion centrally apertured to be received over the male-threaded inner stem end 13, up against the adjacent shoulder or inner end of 17a concentrically grooved at 17g; (b) a square concentric ring portion received in the square section groove 17g; and (c) on the outer periphery of the flat ring part, and on the side opposite the square ring, a semi-circular ring or bead, the roundness of which is continued over the seal ring outer periphery to merge into the flat ring side against the end face of 17a. The outside diameter of the seal 30 in free state, as in O-ring type arrangements, is slightly larger than the inside diameter of bore 16a with which it slideably seals with an interference fit. The washer 31 fits in a resulting face recess within the semi-circular portion, to give internal support; and the washer-like retainer 32 is actually female threaded to be screwed on stem portion 13, up against seal 30 and washer 31, the diameter of the latter preferably being sufficient so that it overlaps the groove 17g and the seal part received therein.

Figure 3:
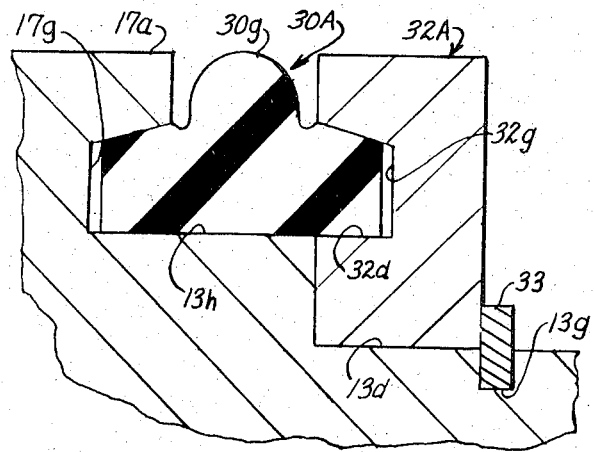
FIG. 3 is a sectional detail of an improved main pressure seal structure similar in action to an O-ring type.
Figure 4:
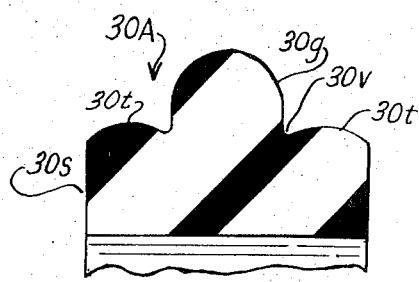
FIG. 4 is a fragmentary section of the seal ring itself.

A useful, improved form of the device 29 is shown in fragmentary FIGS. 3 and 4, wherein the groove 17g, rather than being square in section, has the outer side somewhat sloped or outwardly divergent, so that the groove outer wall is a tapered or female conical surface and the opposed inner wall a male cylindrical surface, the stem having a flat ended portion 3h of reduced diameter, the circumferential cylindrical surface of which is in effect an extension of the groove inner wall or conversely providing a male cylinder entering one end of and supporting at least part of the length of the somewhat T-section ring 30A; the shank of the T-section extending radially of the stem axis. A retainer disk 32A, with an opposed similar groove 32g similarly to provide male cylindrical and conical female surfaces, has its central aperture or bore unthreaded, for a close sliding fit onto an unthreaded stem part 13d on which it is axially retained with sealing compression of seal ring 30A, by a snap ring 33 in a stem groove 13g.

The shape of the seal ring 30A in its free condition, (see fragmentary FIG. 4 showing the shape of the section in its free state) though integrally formed or moulded, may be here considered as comprised of (a) the thick sleeve 30s with internal diameter sized for a tight sliding fit with 13h; (b) a central girdle 30g circumferentially having a semi-circular section and an annular diameter slightly larger than the outside diameters of 32A and of 17a; with the semi-circular section continued in short straight walls to join sleeve part 30s; the section being symmetrical about a radial plane at mid-length. At either side of the girdle, i.e., at each projecting end, the external periphery of sleeve portion 30s has in effect broad beads 30t, in section of convexly arcuate similar contours, with the ends of the arcs thereof closer to the axis than at the region of the shallow U-shaped clearance grooves 30v where, in a reentrant junction, the convex portions join the girdle section. The ring section thus presents a three lobe exterior aspect. The slope of the outer or conical walls of the grooves is such relative to the size and shape of the peripheral end formations 30t, that upon axial approach of the retainer disk toward engagement with the flat end of the reduced stem portion 13h as an abutment shoulder, an initial line contact is made with each end portion of the seal ring at a location well into the grooves.

When assembled as in FIG. 3, the ring end portions, having endwise clearance with the groove bottoms, sealingly engage the sloped or conical walls of the grooves. More importantly, by the relatively shallow slope of the walls and the arcuate beads at 30t, the sleeve ends are cammed or wedged principally radially inwardly in a collet-like action compressing the seal ring ends respectively on and sealing to the cylindrical walls of the grooves 17g and 32g, without any unacceptable distortion or diameter change of the girdle region; the relief present at each groove 30v promoting this action.

With the compressional forces developed upon assembly to squeeze the ring 30A radially into sealing engagement with the endwise inserted unthreaded portion of the stem and/or of the retainer, the fabrication of the stem and retainer may be simplified, avoiding end machining for recessing, by cutting on each rather a radial shoulder and reduced diameter, to provide the groove flat bottom wall and the cylindrical or "straight" wall; the "sloped" or conical wall being provided (as in the quasi-exploded fragmentary sectional view of FIG. 5) by a respective floating or self-centering ring 17r or 32r with center aperture tapered to the desired slope. These rings, preferably identical, then serve only as seal ring compression members, advanced toward each other by engagement with the radial shoulders of stem and retainer when the seal device is assembled on the stem.

Figure 5:
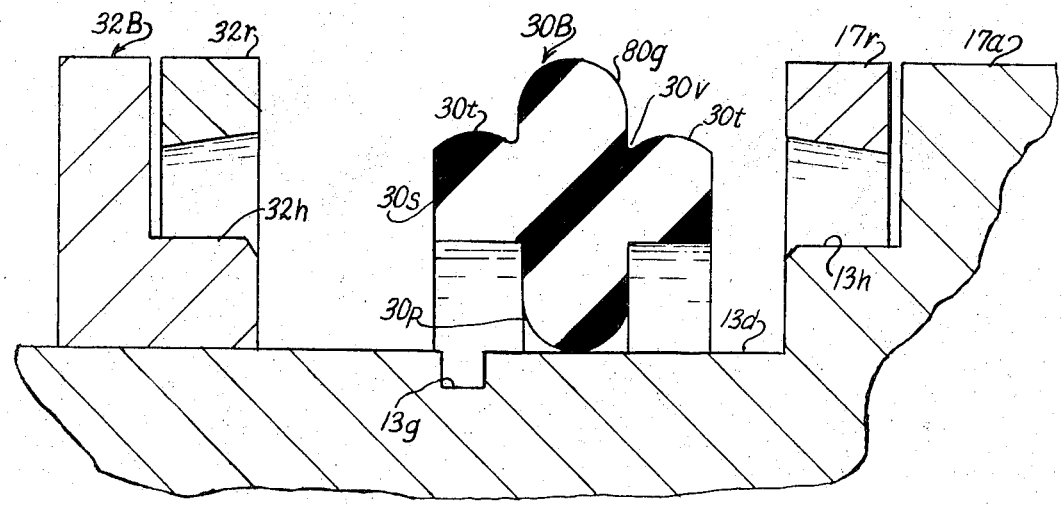
FIG. 5 is a fragmentary section of a further main seal structure modification.

In FIG. 5, a further modification of the seal ring appears at 30B, similar to 30A above described in outer section and circumferential shapes; but here having on the internal surface of the sleeve portion 30s and in opposed relation to the girdle, an inwardly projecting section 30p, with inner periphery semi-circular in cross section merging into a straight parallel-sided annular part captured between the flat but chamfered ends of the small end shoulder of stem portion 17a and the retainer hub projections 32h.

With the modified retainer 32b, in effect a flanged sleeve 32h providing the straight or cylindrical wall of the groove with the groove bottom surface furnished by the inner part of its flange, the above mentioned ring 32r, having an outer diameter equal to that of 17a, provides the sloped or conical wall of the groove. In the cooperating part of the stem enlargement, the hub projection or reduced diameter portion 13h is accordingly shortened from that in FIG. 3; but, as in FIG. 3, has the same outside diameter as the sleeve portion 32h of the retainer providing the cylindrical wall of the respective groove formed with ring 17r in the assembled relation of the parts.

This seal modification, involving the somewhat cruciform seal ring 30B, in addition to sealing at the areas described for the arrangement with the ring 30A, attains a further circumferential seal by the extreme periphery of 30p on the surface 13d; and also with the reduced diameter portions 13h and 32h longer than the axial thickness or length of the rings 17r and 32r, by an appropriate amount, the opposed reduced diameter end faces of the retainer and of the stem enlargement may bear against the opposite straight wall portions of 30p to effect further sealing contacts and ring clamping, also to increase the seal of the rounded internal periphery on 13d. Thus, whereas in ring 30A with the T-section having three external arcuate "lobes," the sealing and securement of the ring to the stem is achieved by the collet-like action developed by the conical surfaces acting on the lower lobes forcing the end regions radially inwardly against the underlying cylindrical surfaces, with the parts held by the split ring 33 in the axial and ring-stressed relation indicated by FIG. 3, with the elements of FIG. 5 similarly held in corresponding relation a fourth lobe in the section provided by 30p offers a further stem seal, and as well an additional engagement for seal ring securement. All disclosed forms moreover eliminate the problem present with a standard moveable O-ring which would extrude from its groove under piston movement in and out of the body bore 16a, and shortly become ineffective for the intended sealing purpose; or which tends to be displaced from its groove also under forces of fluid flow when withdrawn to a valve open position in the flow space enlargement outside the end of the bore as a discharge or outlet region. The latter forms of FIGS. 3–5 avoid necessity of provisions for locking the threaded retainer of FIGS. 1–2, as by a thread distortion after positioning, or other known expedients.

A further advantage of this shut off valving arrangement, with the sliding seal described, arises from the fact that there is not a single fixed point at which the seal ring must be located for shutoff purposes, nor even to attain a shutoff and drainage condition since it is not required for the latter condition that the stem be advanced completely inward to the engagement of shoulders 17a and 16s. Rather within limits there will be in practice a certain randomness on successive shutoffs in the axial position of the seal ring contact with the surface of bore 16a distributing any consequent changes, as it were, wear, in the bore wall, rather than having any such change localized.

I claim:

1. A shutoff valve, operable from open to closed conditions and also optionally to drain the controlled side while closed, by the same operating handle, comprising:

a hollow body having an inlet, an outlet, and a valving chamber, said chamber including
an inner main valving bore and a female threaded formation extending coaxially beyond the bottom end of the inner bore, and
a counterbore at the other end of the inner bore;

said inlet opening into the bottom end region of the inner bore; said outlet opening laterally from the inner end of the counterbore;
a hollow plug-like cap threaded into, and sealed to the body at the outer end of the counterbore,
said cap providing
a cap bore coaxial with and larger in diameter than said inner bore, and
an outer head and end wall having a stem supporting aperture;
a stem having
a threaded inner stem portion engaged in said female threaded formation of the body,
an operating-handle-bearing outer stem portion projecting through and rotatably supported in the aperture of the cap end wall, and
a valving member enlargement between said inner and outer stem portions including adjacent smaller inner and larger outer piston-like coaxial cylindrical portions respectively axially advanceable in one direction into said inner bore and in the other direction into said cap bore upon valve closing and valve opening motions of the stem,
the outer stem portion having a coaxial bore and, adjacent the outer cylindrical portion of the stem, a transverse passage intersecting the last said bore;
first and second circumferential seal ring means on the inner and
outer portions of the valving member enlargement respectively for slideably sealing them to said inner bore and cap bore; said seal means axially spaced to maintain the stem sealed to the cap bore on valve closing inward stem motion until the seal with the inner bore is established to shut off the valve and upon further stem inward motion to withdraw the seal with the cap bore, thereby opening said counterbore, and consequently the outlet, to the cap bore and hence to the stem bore for drainage.

2. A shutoff valve as described in claim 1, wherein said cap terminates in an inner end short of a shoulder formed between said inner bore and counterbore, thereby to produce increased flow area surrounding the stem and between said outlet and, respectively, the inner bore for water supplied to the outlet, and the cap bore for water drainage from the outlet side of the valve.

3. A shutoff valve as described in claim 1, wherein a shoulder formed by the bottom of said counterbore and a shoulder formed between said inner and outer piston-like stem portions cooperate as stops for axially inward stem motion.

4. A shutoff valve as described in claim 3, wherein said outer stem portion has a circumferential groove and an O-ring received therein,
the length of the cap aperture and the spacing of the O-ring from the outer piston-like stem portion being such that after a certain continued axial stem advance inward beyond the point where the valve becomes closed,
the said O-ring seals the said outer stem portion to the wall of said cap aperture so that drainage flow from the cap bore is constrained to discharge entirely through the axial bore of the stem.

5. A shutoff valve as described in claim 4, wherein the outer end of said axial bore of the stem is threaded and receives a hollow or tubular handle-securing screw forming the discharge point of water draining through said stem.

6. A shutoff valve as described in claim 1, wherein said body on opposite sides has aligned piping connections respectively for said inlet and outlet, and an oblique outlet passage from said counterbore to the outlet connection.

7. A shutoff valve as described in claim 1, wherein the said second seal ring means is an O-ring, received in a circumferential groove in the larger outer piston-like portion of the said enlargement of the stem, and having an interference fit with the cap bore when thereinto advanced.

8. A shutoff valve as described in claim 1, wherein the said first seal ring means comprises
an elastomeric seal ring having an at least semi-circularly rounded outer circumferential portion having an interference fit with said inner bore and a smaller annular portion extending axially from the rounded portion, and
means including a retainer secured on the said inner stem portion spaced from and in conjunction with an end formation of said smaller inner cylindrical portion of the stem serving to form a groove for said annular portion and to hold the ring captive.

9. A shutoff valve as described in claim 8, wherein said seal ring has a short symmetrical T-shaped section with the shank of the T directed radially outwardly and having its end semi-circularly rounded to provide said rounded outer circumferential portion, the arms of the T on either side of the shank each being rounded to a convexity forming a reentrant junction with the shank and having a high point spaced half-way between the shank and arm end, thereby forming circumferentially continuous, external rounded beads on the end regions,
respective means on said retainer and on the end of said smaller inner cylindrical portion of the stem providing respective aligned male cylindrical surfaces entering the opposite ends of said ring and female conical surfaces engaging and sealing to said external rounded beads thereby to compress end regions of said ring in collet-like fashion to seal on said male cylindrical surfaces.

10. A shutoff valve as described in claim 1, wherein said cap terminates in an inner end short of a shoulder formed between said inner bore and counterbore, thereby to provide increased flow area surrounding the stem and between said outlet and, respectively, the inner bore for water supplied to the outlet, and the cap bore for water drainage from the outlet side of the valve;
said outer stem portion has a circumferential groove and an O-ring received therein,
the length of the cap aperture and the spacing of the O-ring from the outer piston-like stem portion being such that after a certain continued axial stem advance inward beyond the point where the valve becomes closed,
the said O-ring seals the said outer stem portion to the wall of said cap aperture so that drainage flow from the cap bore is constrained to discharge entirely through the axial bore of the stem; the said second seal ring means is an O-ring, received in a circumferential groove in the larger outer piston-like portion of the said enlargement of the stem, and having an interference fit with the cap bore when thereinto advanced.

11. A shutoff valve as described in claim 10, wherein the said first seal ring means comprises
an elastomeric seal ring having an at least semi-circularly rounded outer circumferential portion having an interference fit with said inner bore and a smaller annular portion extending axially from the rounded portion, and
means including a retainer secured on the said inner stem portion spaced from and in conjunction with an end formation of said smaller inner cylindrical portion of the stem serving to form a groove for said annular portion and to hold the ring captive.

12. A shutoff valve, operable from open to closed conditions and also optionally to drain the controlled side while closed, by the same operating handle, comprising:
a hollow body having an inlet, an outlet, and a valving chamber, said chamber including
an inner main valving bore, and terminating at an open outer end of the body, and
a counterbore between the outer end and the said inner bore;
said body having a female threaded formation coaxial with the said inner bore;
said inlet opening into the bottom end region of the inner bore; said outlet opening laterally from an inner end of the counterbore;

means associated with the body at the said outer end and including a female cylinder communicating with said counterbore and coaxial with and larger in diameter than siad inner bore and providing a stem supporting bearing surface;

a rotatable and axially advanceable stem having
a male thread engaged in said female threaded formation of the body,
an operating-handle-bearing projecting outer stem portion, and
a valving member enlargement inward of said outer stem portion including adjacent smaller inner and larger outer piston-like coaxial male cylindrical portions respectively axially advanceable in one direction into said inner bore and in the other direction into said female cylinder upon valve closing and valve opening motions of the stem,
whereby said stem is rotatably supported by at least one of said smaller inner and larger outer cylindrical portions respectively in said inner bore and said female cylinder; the outer stem portion having a coaxial bore and, adjacent the outer cylindrical male portion, the stem having a transverse passage intersecting the last said bore;

first and second circumferential seal ring means on the inner and other portions of the valving member enlargement respectively
for slideably sealing them to said inner bore and female cylinder,
said seal means axially spaced to maintain the stem sealed to the said female cylinder on valve closing inward stem motion until the seal with the inner bore is established to shut off the valve and upon further stem inward motion to withdraw the seal with the female cylinder, thereby opening said counterbore, and consequently the outlet, to the female cylinder and hence to the stem bore for drainage.

* * * * *